United States Patent [19]

Ludecke et al.

[11] Patent Number: 4,531,363
[45] Date of Patent: Jul. 30, 1985

[54] DIESEL EXHAUST CLEANER WITH ALTERNATING GLOW PLUG BURNER SYSTEM

[75] Inventors: Otto A. Ludecke, Rochester; Terrence L. Stark, Washington, both of Mich.

[73] Assignee: General Motors Corporation, Detroit, Mich.

[21] Appl. No.: 635,557

[22] Filed: Jul. 30, 1984

[51] Int. Cl.³ .............................................. F01N 3/02
[52] U.S. Cl. ...................................... 60/303; 55/466; 55/523; 55/DIG. 10; 55/DIG. 30; 60/311
[58] Field of Search ........................ 60/300, 303, 311; 55/DIG. 30, DIG. 10, 466, 523

[56] References Cited

U.S. PATENT DOCUMENTS 4,404,795  9/1983  Oishi ..................................... 60/303
4,419,108 12/1983  Frost ..................................... 55/523
4,427,418  1/1984  Kogiso ................................... 55/523

Primary Examiner—Douglas Hart
Attorney, Agent, or Firm—Arthur N. Krein

[57] ABSTRACT

A wall flow monolith, for example, of circular configuration has its outer surface at the inlet end cut on tangents so as to provide four chordal flat surfaces with at least alternate channels next to these surfaces plugged at the inlet end so that exhaust flow is through these chordal surfaces into these channels whereby particulates are collected on the chordal surface. Glow plugs are positioned to ignite particulates on these chordal surfaces and, these glow plugs are energized either individually or in sets as an accumulated time function of engine operation.

3 Claims, 4 Drawing Figures

DIESEL EXHAUST CLEANER WITH ALTERNATING GLOW PLUG BURNER SYSTEM

BACKGROUND OF THE INVENTION

This invention relates to diesel engine exhaust treatment systems, and, in particular, to an exhaust cleaner with an alternating glow plug burner system for use in collecting and then incinerating particulates discharged with the exhaust gases from a diesel engine.

DESCRIPTION OF THE PRIOR ART

Considerable interest has been focused on the problem of limiting the mass of particulate matter emitted with the exhaust gases from diesel and other internal combustion engines. In the case of diesel engines, a great deal of effort is currently being expended to develop practical and efficient devices and methods for reducing emission of particulates in exhaust gases.

One method for accomplishing this is to provide a suitable particulate trap in the exhaust system of a diesel engine, the trap having at least one filter positioned therein which is capable of efficiently trapping the particulates from the exhaust gases and which is also adapted to be regenerated as by the in-place incineration of the trapped particulates collected thereby.

A ceramic wall-flow monolith particulate filter of the type disclosed, for example, in U.S. Pat. No. 4,364,761 entitled "Ceramic Filters for Diesel Exhaust Particulates and Methods of Making", issued Dec. 21, 1982 to Morris Berg, Carl F. Schaefer and William J. Johnston, has emerged as a preferred form of such a filter device.

Such a ceramic wall-flow monolith particulate filter includes an outer wall interconnected by a large number of interlaced, thin porous internal walls which define a honeycomb structure to provide parallel channels running the length thereof. Alternate cell channel openings on the monolith face are suitably blocked and, .at the opposite end the alternate channel openings are blocked in a similar manner but displaced by one cell whereby to define inlet channels and outlet channels.

With this filter arrangement, the exhaust gas cannot flow directly through a given inlet channel but is forced to flow through the separating porous walls into an adjacent outlet channels. The exhaust gas is thus filtered as it flows through the porous walls between adjacent channels.

Such a cerammic filter device is suitably located in the engine exhaust system of a vehicle so as to remove particulates from the exhaust gases by trapping of the particulates on the walls of the inlet passages or channels separating them from their associate adjacent outlet channels.

The filter will, with use, then become clogged with the carbonaceous material. The diesel particulates will increase the backpressure in the exhaust system of the diesel engine. It is thus necessary to remove the diesel particulates from the filter from time to time to prevent the deleterious effect on engine performance due to high backpressure.

The carbonaceous particulates, thus collected, can be removed from the filter by raising the temperature of the inlet gas to the particulate ignition temperature to effect incineration thereof. The carbonaceous particulate when produced from normal diesel fuel, that is, D-2 diesel fuel, will ignite if the temperature is raised to approximately 600° C. in the presence of 15%–18% oxygen.

However, as is well known, a diesel engine achieves exhaust temperatures of this magnitude only under very severe engine loading conditions. Therefore, a supplementary source of heat to rise the exhaust inlet temperature to the wall flow ceramic filter is normally necessary. This usually requires the use of a relatively costly heat source, such as a fuel burner or an electric resistance heater, in series with the exhaust flow to raise the temperature of the gases to approximately 600° C.

It is also known in the art, that fuel additives, such as copper napthtenate, copper acetate, tetraethyl lead and manganese (MMT), in the diesel fuel will reduce the ignition temperature of diesel particulates to approximately 320° C.–420° C. The quantity of the additive content in the fuel has normally been from about 0.05 gm/gal to 0.75 gm/gal to effect this desired reduction of ignition temperature of the particulates.

It is also known that diesel particulates that are deposited on a fairly low heat conductive surface, whether it is metallic or ceramic in nature, can be ignited in a small area by glowing engine sparks, electric arc or heater, or a small pin point torch type fuel burner. After ignition, using the above described metallic additives in the fuel, the particulate burning will readily propagate over those surfaces of the filter on which the particulates have been previously deposited in sufficient quantity.

As described above, the fuel additive normally will reduce the ignition temperature of the particulates to as low as 320° C. depending on the additive and concentration used. In addition, the burning of a small portion of the particulate causes continuous layers to ignite and the combustion propagates, if a sufficient quantity of particulates has been collected. It is presumed that the metallic additive after having been exposed to the engine combustion process is throughly oxidized. These oxidized metallic particulates are throughly dispersed in the carboneous particulates. When the temperature of this dispersion is locally raised in temperature, then an exothermic reaction occurs. The oxygen molecules in the metal oxide freely combines with the carbon to form CO and $CO_2$. The reaction produces a large quantity of energy and increased gas temperature which can cause continuous ignition of the surrounding layers of the metal oxide-carbon dispersion, provided, of course, that a sufficient layer of particulates has been accumulated to permit such continuous regeneration.

In order to insure that a suitable layer of particulates have been collected on a filter before initiating such ignition of the particulates while at the same time in order to limit excessive buildup of backpressure across the filter, suitable control systems have been used to control the operation of the particulate igniters, whether they be in form of fuel burners, electric heaters or glow plugs, based on input signals of various engine operating conditions and of the pressure differential existing across the filter during engine operation.

SUMMARY OF THE INVENTION

Accordingly, a primary object of the invention is to provide an improved exhaust cleaner and burner system for use with a diesel engine that utilizes a ceramic monolith wall flow filter having separated, plural, continuous outer peripheral particulate collecting surfaces at the inlet end thereof, with each such surfaces having an electrical igniter associated therewith, the igniters being sequentially energized as a time function of engine operation.

Another object of the invention is to provide an improved exhaust cleaner with a burner system utilizing plural glow plug igniters that are alternately energized as a time function of engine operation to ignite particulates collected on corresponding plural collecting surfaces provided on a ceramic, monolith wall flow particulate filter positioned to receive exhaust gases discharged from a diesel engine.

For a better understanding of the invention, as well as other objects and further features thereof, reference is had to the following detailed description of the invention to be read in connection with the accompanying drawings.

DESCRIPTION OF A PREFERRED EMBODIMENT

Figure 1:
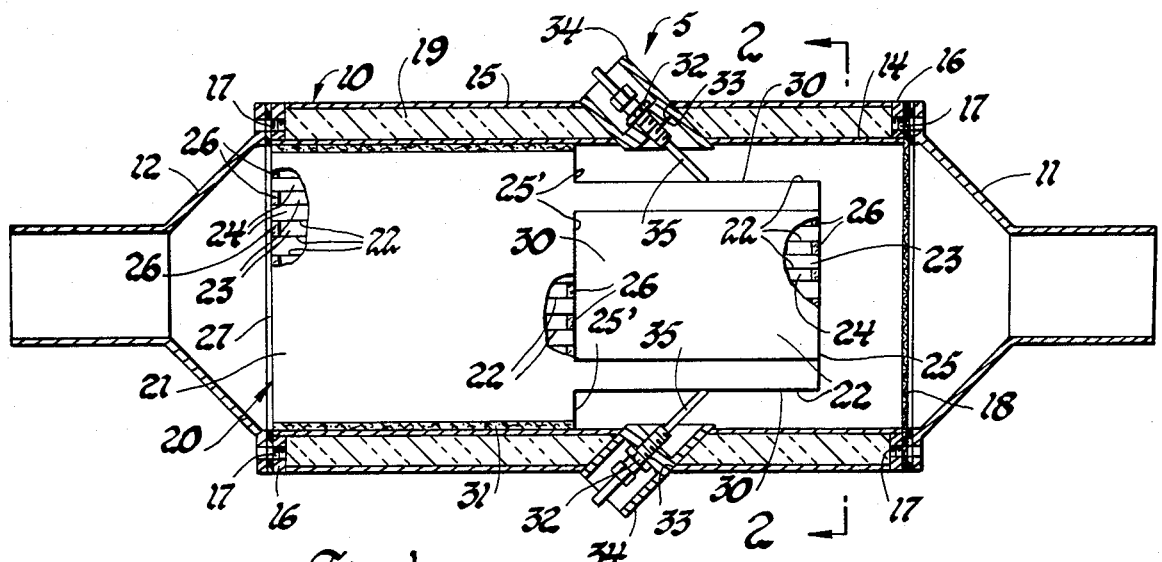
FIG. 1 is a schematic view, with parts broken away, of a diesel exhaust cleaner with alternating glow plug igniter burner system in accordance with a preferred embodiment of the invention.

Referring first to FIG. 1 there is illustrated a single path exhaust cleaner with an alternating glow plug igniter burner system in accordance with the invention for use with a diesel engine.

The exhaust cleaner, generally designated 5, in the contruction shown, is provided with a tubular trap housing that includes a filter or trap housing 10 having a conventional exhaust inlet 11 at one end and an exhaust outlet 12 at its opposite end.

In the construction shown, the filter housing 10 includes a circular inner shell 14 and an outer shell 15 loosely encircling the inner shell 14, with these shells suitably fixed, as by welding, at their opposite ends to a pair of ring-like flanges 16. Each flange 16 is provided with circumferentially spaced apart, internally threaded apertures 17, by which the exhaust inlet 11 and exhaust outlet 12 can be secured as by screws, not shown, to the filter housing 10.

Preferably as shown, a conventional type inlet diffuser screen 18 is sandwiched between the flange 16 at the inlet end of the housing 10 and the exhaust inlet 11 to insure more uniform flow of exhaust downstream thereof.

As shown, a suitable high temperature resistant, thermal insulating material 19 is loosely sandwiched between the inner and outer shells 14 and 15, respectively, along their axial extent between the flanges 16.

A ceramic wall-flow monolith particulate filter 20, of the general type shown, for example, in the above-identified U.S. Pat. No. 4,364,761, except as modified in the manner described in detail hereinafter, is suitably supported at its discharge end in a known manner within the inner shell 14 of the filter housing 10 with its inlet end face 25 located a predetermined axial distance from the exhaust inlet 11.

As described in the above-identified U.S. Pat. No. 4,364,761, the filter element 20, for example, can be first formed as an extruded open-ended ceramic monolith as used, for example, in catalytic converters, after which the monolithic structure is converted into a filter element having alternate passages plugged, as by closing the ends with a suitable cement material or the like to form the desired end closing walls or plugs.

In the construction shown, the particulate filter 20 was originally formed so as to provide a surrounding, cylindrical outer wall 21 internally interconnected by a large number of interlaced thin porous internal walls 22. The interlaced wall 22 define internally thereof two groups of parallel passages or channels including respectively inlet channels 23 and outlet channels 24, each extending to opposite ends of the element 10. The inlet channels 23 are open at the inlet end 25 of the element and are closed by plugs 26 at the outlet end 27 of the element, while the outlet channels 25 are closed by plugs 26 at the element inlet end 25 and open at the outlet end 27.

Figure 2:
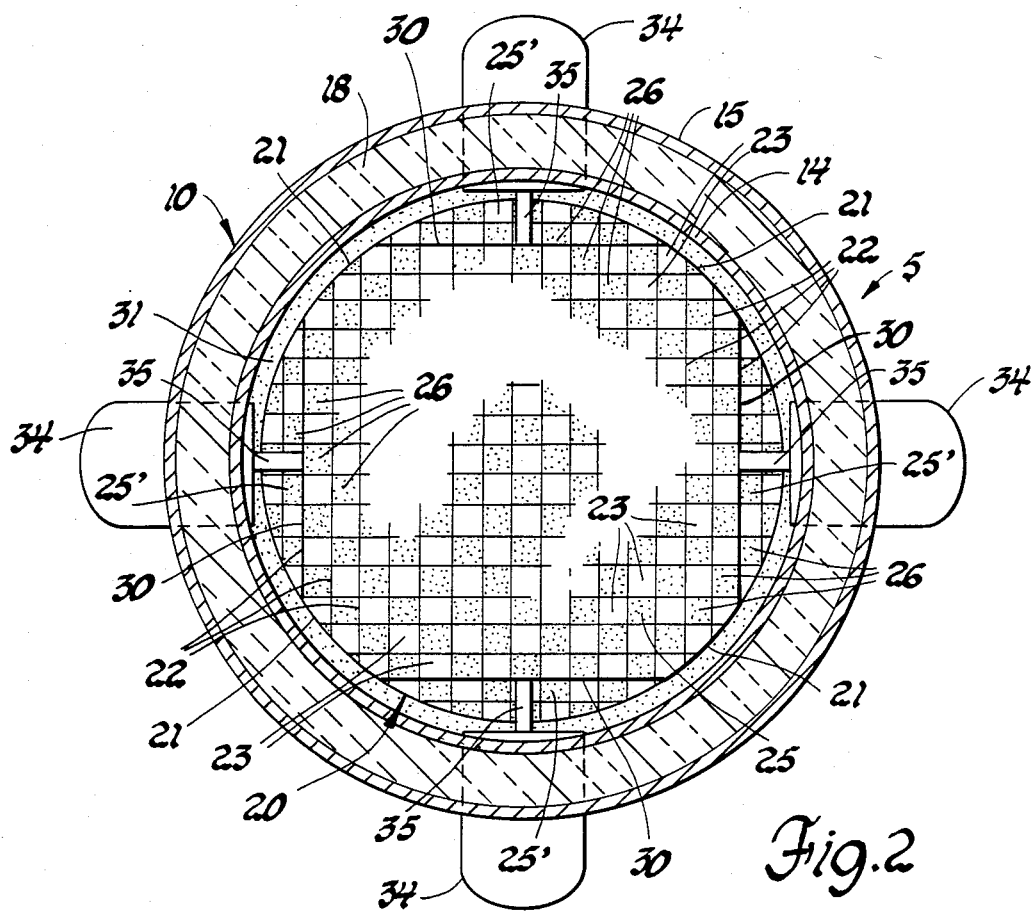
FIG. 2 is an enlarged sectional view of the filter inlet end of the system of FIG. 1 taken along line 2—2 of FIG. 1, the channels of the filter being substantially enlarged for purposes of illustration.

In the construction shown, the channels are of square cross-section as best seen in FIG. 2, although, as disclosed in the above-identified U.S. Pat. No. 4,364,761, numerous other configurations could be utilized. Further, the inlet and outlet channels 23 and 24, respectively, are arranged in vertical and horizontal rows (as viewed in cross-section), with the inlet channels 23 alternating with exhaust channels 24 in a checkerboard pattern. Thus, it will be appreciated that each interior wall 22 portion of the element lies between an inlet channel and an outlet channel at every point of its surface except where it engages another wall, as it does at the corners of the channels. So, except for the corner engagement, the inlet channels 23 are spaced from one another by intervening outlet channels 24 and vice versa.

The construction of the ceramic monolith is such that the interior walls 22 are porous so as to permit passage of exhaust gases through the walls from the inlet to the outlet channels 23 and 24, respectively. The porosity of the walls is sized appropriately to filter out a substantial portion of the particulates present in diesel exhaust gases.

Now in accordance with a feature of the invention, the particulate filter 20 is constructed and mounted in the housing 10 so that separate spaced apart outer peripheral surfaces at the inlet end portion of the filter will function as particulate filtering surfaces for a purpose to be described in detail hereinafter.

Accordingly, in the construction shown, the monolith, as originally formed, was of circular cylindrical configuration. Thereafter, this monolith structure was cut at the inlet end 25 portion thereof to provide at least two spaced apart chordal flats 30 along interconnecting walls 22, four such chordal flats 30 being provided in the embodiment shown. Each such chordal flat 30 is formed so as to extend for a suitable predetermined axial distance from the inlet end 25. In the embodiment shown for a particular application, these chordal cuts were made after firing of the extruded ceramic monolith, although, it will be apparent to those skilled in the art that such cuts can be made before the firing of the ceramic monolith.

In the construction illustrated, four spaced apart chordal flats 30 were provided on the filter with these flats extending for about 30% to 50% of the total axial extent of the filter length. Thus as shown, each such chordal flat 30 was formed so that it is preferably separated from the next adjacent chordal flats 30 by portions of the adjacent cylindrical outer wall 21.

With this arrangement, the particulate filter 20 has, in effect, two inlet ends, that is, the inlet end 25 at the upstream end, in terms of exhaust flow, of the filter and an inlet end 25' next adjacent to the chordal flats 30 having plugs 26 in alternate channels therein in a pattern conforming to that established at the inlet end 25. Accordingly, with this structural configuration of the particulate filter 20, this filter 20 is supported and sealed within the housing 10 by a ring of suitable high temperature resistant material 31 sandwiched between the outer wall 21 at the outlet end 27 portion of the filter and the interior wall of the inner shell 14. As thus mounted, the material 31 operates so as to prevent the bypass flow of particulate contaminated exhaust flow around the filter 20.

With this filter 20 embodiment and mounting arrangement shown, during engine operation as the exhaust gas flows through the exhaust inlet 11 into the interior of the housing 10, part of the exhaust gas can flow over the chordal flats 30 and then pass through the associate walls 22 defining such flats into the adjacent outer outlet channels 24 whereby particulates will collect on the exterior wall 22 surfaces of these chordal flats 30.

Now in accordance with a feature of the subject invention, the particulates collected on the individual exterior surfaces of the chordal flats 30 are ignited by suitabe electrical igniters, such as glow plugs 32, one such glow plug being associated with each of the chordal flats 30, with these glow plugs being energized in alternate sequence as a time function of engine operation, either individually or, if desired, in pairs as in the embodiment illustrated.

For this purpose with reference to the embodiment shown, the inner and outer shells 14 and 15, respectively, of the housing 10 are provided with four circumferentially spaced apart apertures 33, each being sized so as to receive a tubular glow plug retainer 34. Each such glow plug retainer 34 is suitably secured within the associate aperture as by being welded to these shells. As shown, the glow plug retainers 34 are positioned so that a glow plug 32 secured therein will have its sheath tip 35 positioned so as to be operative whereby to initiate incineration of particulates collected on the associate chordal flat 30.

Figure 3:
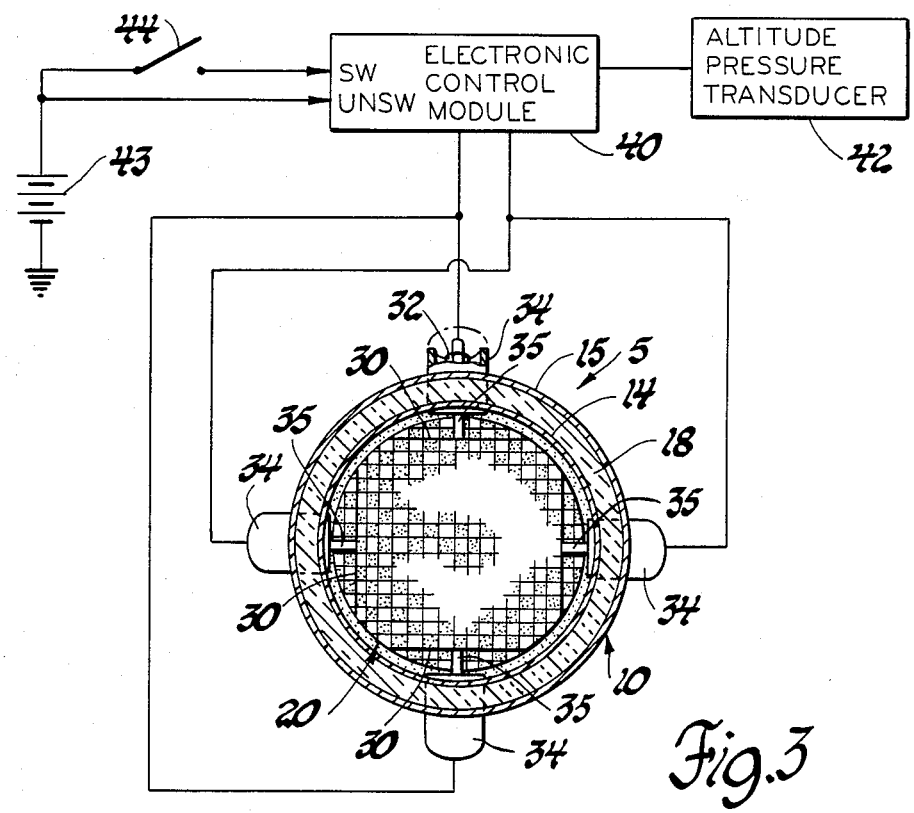
FIG. 3 is a schematic diagram of the system of FIG. 1 with burner electric control circuit; and, FIG. 4 is an operational logic flow diagram of the electric control circuit embodiment of FIG. 3.

In general, in accordance with a feature of this invention, the glow plugs 32 can be electrically connected so that each of the glow plugs is alternatively energized as a time function of engine operation or, as shown in FIG. 3, they are electrically connected in sets of two whereby each such set is sequentially energized as a time function of engine operation. In addition, the exhaust cleaner 5 is preferably located near the rear of an associate vehicle so as to be suitably spaced from the diesel engine whereby to avoid forced high temperature exhaust speed and load regenerations and also so as to aid in the collection of solubles in the discharged exhaust gas.

By using such alternating glow plugs or sets thereof, a simplified burner control system can be used to energize the glow plugs. Thus costly sensors, such as, for example exhaust backpressure sensors, such as normally used in diesel particulate burner control systems to determine regeneration intervals, need not be used. This is beneficial since such known backpressure sensors can become inoperative if the backpressure line fills up with moisture and freezes up solid during cold weather operating conditions or if they plug up with unburned soot over a long period of time.

Now with reference to the burner control system shown in FIG. 3, in order to simplify the burner control system in a particular vehicle application, the glow plugs 32 were arranged in pairs with the plugs in each pair set being opposed to each other and arranged so as to be sequentially energized as a time function of engine operation via an electronic control module ECM 40 for a predetermined time period, as desired. The electronic control module ECM 40 is of a conventional programmed digital computer type such as used for the electronic fuel injection control system for an engine, as well known in the art, but with additional programming as described herein.

As is conventional, the electronic control module ECM 40 would include a microprocessor which executes an operating program permanently stored in a read-only memory which also contains lookup tables addressed in accord with the values of selected operating parameters as will be described hereinafter. Such a microprocessor may take the form of a Motorola MC-6800 Series microprocessor and the electronic control module ECM 40 may, for example, be of the type disclosed in U.S. Pat. No. 4,402,294 entitled "Fuel Injection System Having Fuel Injector Calibration", issued Sept. 6, 1983 to Harold R. McHugh and William L. Walters, the disclosure of which is incorporated herein by reference thereto.

As shown, an altitude pressure sensor 42 preferably is used so as to shift the time frequency rate of energization of the glow plugs, to insure proper intervals of trap regeneration. This altitude pressure transducer or sensor 42 is used so as to obtain a shorter time span between trap regeneration cycles with increased altitude since more frequent regenerations are required during vehicle operation in the mountains, for reasons well known in the art.

The electronic control module ECM 40 also includes a power control unit that is connected so as to receive a switched voltage input from the vehicle battery 43 via a conventional vehicle engine ignition switch 44 and so as to also receive an unswitched voltage input from the battery 43 whereby the microprocessor will have memory retention of the accumulated engine operation time when the engine ignition switch 44 is in the open or off position, in a manner well known in the art.

Burner Control System Operation

For a particular exhaust cleaner/engine application, as an example, the microprocessor was programmed so as to sequentially energize the two sets of glow plugs, in the illustrated embodiment, at approximately forty minute time intervals as a function of the accumulated time of engine operation at operational altitude levels below 4000 ft.

Thus in this example and using a software timer, located in the RAM (Random Access Memory), not shown, portion of the electronic control module ECM 40, the system program was such that after an accumulated engine operation time interval of 40 minutes, the first set of glow plugs 32 is energized for approximately 60 seconds and then the second set of glow plugs 32 is energized for the same time interval after another accumulated engine time interval of 40 minutes, that is, eighty minutes after the original time start count of engine operation. This routine for the sequential energization of the two sets of glow plugs 32 is illustrated in FIG. 4, which is a flow diagram of the operation of the control system as pre-established for a particular application by the programming of the microprocessor, the operation of which is self-explanatory to those knowledgeable in the art, but which is briefly described next hereinafter.

Figure 4:
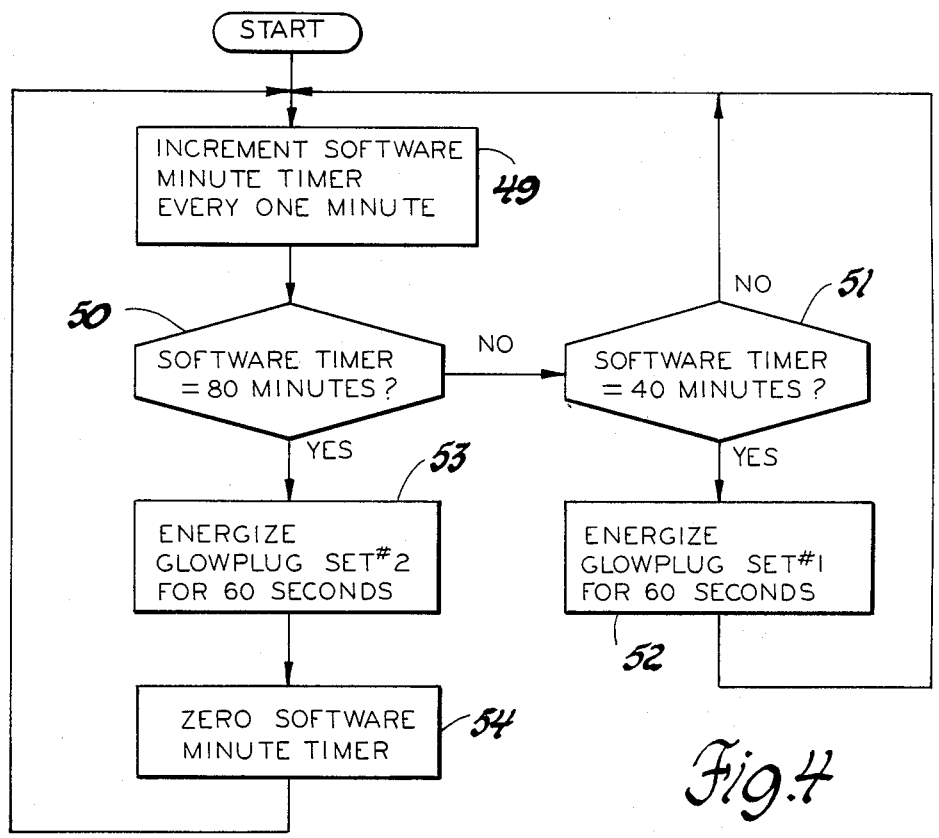

When the ignition switch 44 is turned on, the electronic control module 40 first loads a software minute timer location in RAM with an accumulated time count from non-volatile memory and then initiates the program of FIG. 4 every minute, either as a subroutine of its main program or as an interrupt routine. Beginning at start, the program first increments the software minute timer 49 location in RAM. If ignition switch 44 is turned off at any time, a shutdown subroutine causes the present count in this location to be stored in non-volatile memory, from which it can be reloaded upon the next closure of switch 44. From step 49 the program then proceeds to a decision point 50, wherein the time count is compared to a first time constant equivalent to an engine operation time of 80 minutes. If the time count is less than the 80 minute time constant, the program proceeds to decision point 51. At decision point 51 the time count is compared to a second time constant equivalent to an engine operation time of 40 minutes. If the time count is less than 40 minutes the program returns to step 49.

When the time count accumulates to the 40 minute time interval the program proceeds from decision point 51 to energize the first set of glow plugs for 60 seconds in step 52. Thereafter the program returns to the start. However, when the time count accumulates to the 80 minute time interval, the program proceeds from decision point 50 to energize the second set of glow plugs for 60 seconds in step 53. After this time interval, the software minute timer is then reset to a zero time count in step 54 and returns to step 49 to begin a new time count.

With this arrangement of sequential energization of the sets of glow plugs if, for example, at the time the first set of glow plugs are energized there is an insufficient layer build-up of collected particulates on the associate chordal flats 30 to provide the necessary heat to effect a complete regeneration of the particulate, it is then likely that such build-up of collected particulates will have occurred on the chordal flats 30 associated with the second set of glow plugs during the time interval which will have occurred before the energization of the next set of glow plugs.

Thus by the sequential energization of individual glow plugs or sets thereof associated with separate particulate collecting surfaces as defined by the separated chordal flats 30, complete filter regeneration cycles can be initiated without the need of determining sufficient particulate build-up on the particulate collecting surfaces by measurement, for example, of the pressure drop across the filter as in the prior art burner control systems.

The microprocessor is also preferably adapted to receive an altitude signal from the pressure transducer 42 and is thus preferably programmed so as to reduce the above described time constants as a preprogrammed function of increases in the altitude at which the vehicle engine operates.

While the invention has been described with reference to the structure disclosed herein, it is not confined to the specific details set forth, since it is apparent that many modifications and changes can be made by those skilled in the art. For example, all of the channels next adjacent to each of the chordal flats could be plugged at the inlet end whereby particulates would collect over the entire chordal flat surface. As another example, the microprocessor could be programmed so as to sequentially energize the glow plugs 32, either individually or in sets, at pre-selected approximate time intervals, as timed in effect, as a function of accumulated engine revolutions between energization cycles of the glow plugs, based on a predetermined assumed operations speed of the vehicle. Furthermore, if desired, all of the channels in the row next adjacent to each of the chordal flats can be plugged, if desired, in a manner similar to that shown, for example, in European patent application No. 0 089 127 A published Sept. 21, 1983.

This application is therefore intended to cover such modifications or changes as may come within the purposes of the improvements or scope of the following claims.

The embodiments of the invention in which an exclusive property or privilege is claimed are defined as follows:

1. A diesel engine and exhaust cleaner and burner system for use with said diesel engine, said exhaust cleaner and burner system including a housing having an inlet at one end for receiving exhaust gases discharged from said engine and an exhaust outlet at its opposite end; a through flow exhaust particulate filter operatively positioned in said housing and having an inlet end adjacent to said inlet and an outlet end next adjacent to said exhaust outlet in operative sealing engagement with said housing next adjacent to said exhaust outlet, said particulate filter being a cylindrical ceramic monolith structure with chordal flats at its inlet end and with a plurality of thin interlaced porous walls defining a plurality of parallel passages extending to opposite inlet and outlet ends thereof, said passages including a first group comprising inlet passages open at said inlet end and closed by plugs at the outlet end and a second group comprising outlet passages closed by plugs at said inlet end and open at said outlet end, the arrangement being such that there is defined angular spaced apart outer chordal flat porous wall areas through which exhaust gases can flow adjacent to said inlet end; a plurality of electrical igniters, one each of said igniters being operatively associated with one of said outer chordal flat porous wall areas; and electrical control means operatively connected to said electrical igniters so as to sequentially energize said igniters as a time function of said engine operation.

2. A diesel engine and exhaust cleaner and burner system, said exhaust cleaner and burner system including a housing having an inlet at one end for receiving exhaust gases discharged from an engine and an exhaust outlet at its opposite end; a through flow exhaust particulate filter operatively positioned in said housing and having an inlet end adjacent to said inlet and an outlet end next adjacent to said exhaust outlet in operative sealing engagement with said housing next adjacent to said exhaust outlet, said particulate filter being a ceramic monolith structure of generally cylindrical configuration at its outlet end and having spaced apart chordal flats at its inlet end, said monolith structure having a plurality of thin interlaced porous walls defining a plurality of parallel passages extending to opposite inlet and outlet ends thereof, said passages including first group comprising inlet passages open at said inlet end and closed by plugs at the outlet end and a second group comprising outlet passages closed by plugs at said inlet end and open at said outlet end, the arrangement being such so as to define angular spaced apart chordal porous wall surfaces through which exhaust gases can flow adjacent to said inlet end; a plurality of electrical igniters, one each of said electrical igniters being operatively associated with one of said chordal porous wall surfaces; and electrical control means operatively connected to said electrical igniters whereby to sequentially energize said igniters as an accumulated time function of said engine operation.

3. A diesel engine and exhaust cleaner burner system according to claim 2 wherein said ceramic monolith structure has four of said chordal porous wall surfaces circumferentially spaced apart at said inlet end, and wherein said electrical igniters are glow plugs electrically arranged in sets of two each associated with opposed said chordal porous wall surfaces with said sets of said glow plugs thus arranged so as to be sequentially energized in pairs.

* * * * *